United States Patent [19]
Shevach et al.

[11] Patent Number: 5,872,730
[45] Date of Patent: Feb. 16, 1999

[54] COMPUTERIZED CORRECTION OF NUMERIC DATA

[75] Inventors: Ronen Shevach, Netanya; Aviad Zlotnick, Mitzpe Netafa, both of Israel

[73] Assignee: International Business Machines Corporation, Armonk, N.Y.

[21] Appl. No.: 608,892

[22] Filed: Feb. 29, 1996

[30] Foreign Application Priority Data

Oct. 17, 1995 [GB] United Kingdom .................. 9521206

[51] Int. Cl.[6] .................................................. G06F 11/00
[52] U.S. Cl. .......................................................... 364/737
[58] Field of Search ........................... 364/737; 382/228, 382/226, 310; 704/255, 256

[56] References Cited

U.S. PATENT DOCUMENTS

| | | | |
|---|---|---|---|
| 5,276,741 | 1/1994 | Aragon | 382/310 |
| 5,608,841 | 3/1997 | Tsuboka | 704/256 |
| 5,617,486 | 4/1997 | Chow et al. | 704/256 |
| 5,636,291 | 6/1997 | Bellegarda et al. | 382/228 |
| 5,644,652 | 7/1997 | Bellegarda et al. | 382/228 |

*Primary Examiner*—Tan V. Mai

[57] ABSTRACT

Apparatus and a method is described for correcting a set of stored digital representations of numbers having an estimable error probability distribution where there is at least one known arithmetic relation between the numbers which can be expressed as a sum, difference or equality. The invention finds particular, but not exclusive, application to the correction of optical character recognition (OCR) results. Hidden Markov Model optimization logic is employed for finding the most likely path through a set of states in accordance with probability functions recording the likelihood of transitions between the states giving rise to a set of event-related observations. The system is arranged so that the states are possible accumulated totals generated by adding or subtracting ones of the numbers to or from an initial accumulated total, addition or subtraction of the numbers to or from an accumulated total or equality of an accumulated total with the numbers are the events causing transitions from state to state, the digital representations are the event-related observations, and the error probability distributions are the probability functions, the apparatus comprising means to correct the digital representations in accordance with events giving rise to the most likely path through the states.

10 Claims, 7 Drawing Sheets

COMPUTERIZED CORRECTION OF NUMERIC DATA

FIELD OF THE INVENTION

This invention relates to apparatus and methods for correction of stored digital representations of numeric data. The invention finds particular, but not exclusive, application to the correction of optical character recognition (OCR) results.

BACKGROUND OF THE INVENTION

Various automatic document processors have been marketed by various manufacturers for use for example with cheques and other kinds of forms in, for example, the finance industry, tax offices and other areas where large numbers of documents must be handled. Typically, these machines read indicia on a document using magnetic or optical techniques. For a variety of reasons the reading of the indicia may be in error. For example the document may be moving rapidly, the printing or handwriting on the document may be imperfect or the document may be damaged.

Various methods have been proposed to identify and/or correct errors in reading. For example in systems typified by U.S. Pat. No. 3,764,978 where characters are recognized both magnetically and optically, readings are rejected when the two systems indicate different symbols. This adds hardware and software to the system and can lead to a substantial number of reject readings.

Other techniques such as keying or manual verification of the amount of each item have also been proposed. This represents a substantial amount of additional manual labor.

In many cases, contextual information can be used to improve the quality of an OCR result. For example, in the case of words a dictionary lookup operation is sometimes used to ensure that a recognized word is valid.

In the case of numbers, there may be an arithmetic relation between a set of numbers which might be used both to indicate that an error has been made and to correct the error.

For example, EP-A-446633 discloses apparatus for automatic processing of cheques in which, in the event of a discrepancy between a cheque amount and a summary document, such as a deposit slip or cash letter, an expert system uses logic, stored rules, error probabilities and alternate numeric values to try to correct the errors.

Of course, the straightforward way to deal with inconsistent arithmetic, would be to try combinations of alternate values produced by an OCR process until consistency is achieved. However, this is a procedure for which the computing resources required increase exponentially with the number of figures involved and therefore it can only practically be applied to relatively small bodies of data and with a small number of combinations.

SUMMARY OF THE INVENTION

This invention is directed to providing an apparatus and method for correcting numeric data in accordance with arithmetic constraints which makes more efficient use of computing resources.

To achieve this, the invention provides apparatus for correcting a set of stored digital representations of numbers, the digital representations each having an estimable error probability distribution and there being at least one known arithmetic relation between the numbers which can be expressed as a sum, difference or equality, characterized by Hidden Markov Model optimization logic for finding the most likely path through a set of states in accordance with probability functions recording the likelihood of transitions between the states giving rise to a set of event-related observations, the system being arranged so that the states are possible accumulated totals generated by adding or subtracting ones of the numbers to or from an initial accumulated total, addition or subtraction of the numbers to or from an accumulated total or equality of an accumulated total with the numbers are the events causing transitions from state to state, the digital representations are the event-related observations, and the error probability distributions are the probability functions, the apparatus comprising means to correct the digital representations in accordance with events giving rise to the most likely path through the states.

In a preferred embodiment the numbers are single digits, although the possibility that a similar approach be used for combinations of digits is not excluded.

Preferably the apparatus comprises logic for generating a carry forward value from a sequence of numbers to form an initial accumulated total for a second sequence of numbers. This enables a more efficient implementation for sums or differences of numbers which include more than one digit.

This approach results in a process for which the computing time required is linear in the number of numbers involved and which is therefore better adapted to handle sums or differences involving larger numbers of numbers.

The invention finds particular application in optical character recognition apparatus wherein the digital representations are a set of observed recognition results. However, application of the technique to digital representations from other sources is not excluded. For example, the invention would be equally applicable to data which has been manually keyed in, and for which common keying errors would give rise to estimable error distributions.

Viewing the invention from another aspect, there is also provided a method for correcting a set of stored digital representations of numbers, the digital representations each having an estimable error probability distribution and the numbers having at least one known arithmetic relation between them which can be expressed as a sum, difference or equality, characterized by finding the most likely path through a set of states in accordance with a probability function recording the likelihood of transitions between the states giving rise to a set of event-related observations, the system being arranged so that the states are possible accumulated totals generated by adding or subtracting ones of the numbers to or from an initial accumulated total, addition or subtraction of the numbers to or from an accumulated total or equality of an accumulated total with the numbers are the events causing transitions from state to state, the digital representations are the event-related observations, and the error probability distributions are the probability functions, and correcting the digital representations in accordance with events giving rise to the most likely path through the states.

BRIEF DESCRIPTION OF DRAWINGS

An embodiment of the invention will now be described, by way of example only, with reference to the accompanying drawings, wherein.

DETAILED DESCRIPTION OF THE INVENTION

Figure 1:
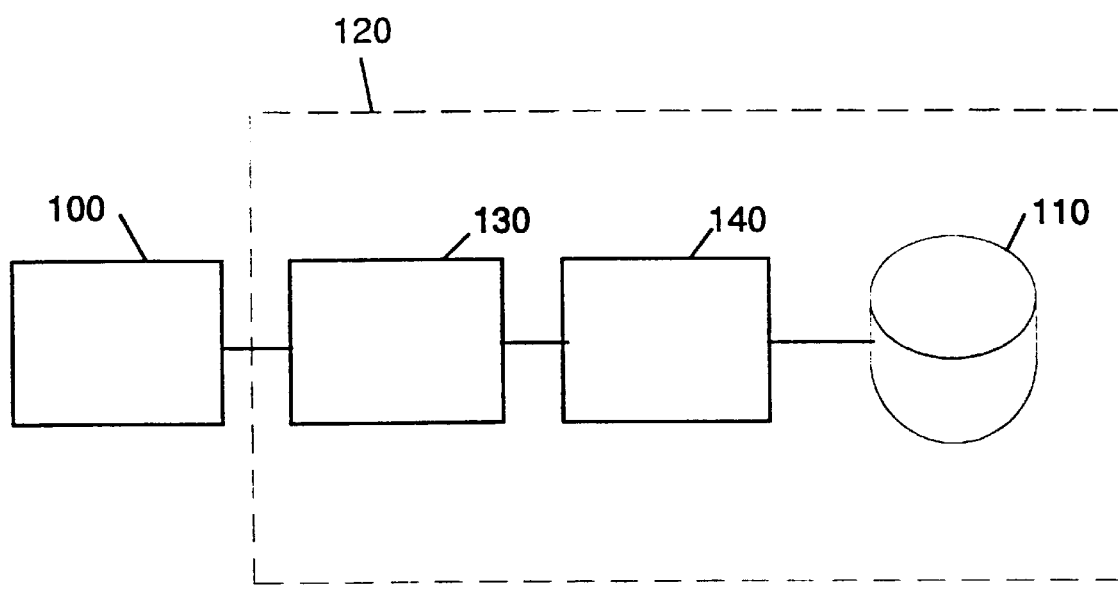
FIG. 1 is a schematic diagram showing apparatus for machine reading of printed or handwritten information.

Referring to FIG. 1, apparatus for machine reading of printed or handwritten text comprises an image capture device 100 of any suitable known type, which may be, for example, an image capture camera or an optical scanner. Such a device generates an electronic signal representative of the markings on a document. In this example, the image is digitized in the form of a bi-level bitmap comprising rows and columns of binary pixels and stored in a suitable format in a data storage device 110, although many other arrangements are possible, for example using grey level images. The signal from the image capture device 100 is passed to a data processing system 120 which includes data storage device 110, OCR module 130, and error correcting module 140.

In this embodiment, the data processing system 120 is a general purpose computer workstation of conventional type which operates under the control of suitable programs to carry out the recognition and correction tasks described herein. The computer workstation could be, for instance, one of the IBM RISC SYSTEM/6000 family of computers (IBM and RISC SYSTEM/6000 are trademarks of International Business Machines Corporation).

It will be understood, however, that the invention could be implemented in the form of hardware using specially designed circuits or using any combination of special or general purpose hardware or software.

OCR module 130 is of conventional type and can employ any one of the many known OCR techniques for handwritten or printed characters. For the sake of example, it is assumed that the function of the OCR module is to take as input an image in a suitable digital form which notionally contains only a single character, to identify which one of a number of characters in a finite character set the image most closely corresponds to and to associate with the image a most likely digital code corresponding to the character, a confidence value or probability of this character being correct and in some cases alternative most likely digital codes corresponding to the character and their associated confidence value or probability. Of course, it will be appreciated that many OCR modules can handle images which contain several characters using appropriate segmenting techniques and the like.

Figure 2:
FIG. 2 is an example of an image of a handwritten sum.

FIG. 2 shows an example of an image of a handwritten form which contains a column of numbers and their sum. During the OCR process each numeric digit is recognized individually by OCR module 130. However, for each digit there is a finite probability that this recognition operation will be in error. However, as described in more detail below, the arithmetic relation between the numbers and their sum can be used to improve the quality of the OCR.

For example, the column of numbers of FIG. 2 may be recognized by the OCR module as follows:

|       |   |
|-------|---|
|       | 1 |
|       | 3 |
| Total | 9 |

Clearly, this arithmetic is wrong. However, some further information is available which makes it possible to correct the OCR result. There are three forms in which this information may be available. First, the OCR module may suggest more than one possibility for some digits. Secondly, some commercially available OCR modules produce a probability for every digit. In such cases eliminating the arithmetic consistency involves finding the most probable combination of digits that is consistent. Thirdly, one may have a priori knowledge on the tendency of a specific OCR module to confuse digits. This also results in a probability for every digit in every place but is somewhat less exact than the previous case.

In the present approach, a series of numbers are considered to be arranged in a number N of rows with a numerical relation between each row. If M is the number of digits in the longest number in the series, then the numbers can be considered to be arranged in an N×M+1 matrix, which will denoted K as follows:

$$\begin{pmatrix} 1 & 0 \\ 3 & 0 \\ 9 & 0 \end{pmatrix}$$

Of course it will be realized that even if the numbers are not actually in columns like this on the form to be recognized they may be put, or considered to be, in this form by suitable transformation and/or mapping of the recognition results.

The information regarding the likelihood of error in each digit allows a confusion vector $P(i,j,x)$ to be prepared for each position in this matrix, i.e., for $i=1 \ldots N$ and $j=0 \ldots M+1$. $P(i,j,x)$ is the likelihood that the real digit underlying the observed digit is x. As described above $P(i,j,x)$ may be determined in any suitable way, for example by the OCR module or derived from information provided by the OCR module or from a priori knowledge.

As a concrete example, $P(1,1,x)$ might be the vector (0,0.9,0,0,0,0,0,0.1,0,0) representing the likelihood that the real digit which in the image was recognized as a 1 be 0,1,2,3,4,5,6,7,8,9 respectively. In other words, in this case the probability of the 1 being correct is assumed to be 0.9, but there is also a probability of 0.1 that the actual digit is a 7.

In the present approach, a Hidden Markov Model is used to find the most likely set of recognition results which is consistent with the arithmetic constraints. Hidden Markov Models are a well known way of using a Markov process to model changing statistical characteristics that are only manifested through actual observations.

In this case, the states of the Markov model are the possible values of an accumulated total produced by adding or subtracting the digits above a current row position in a column. In moving down a column from one row position to the next, a transition is made between states by adding or subtracting from this accumulated total the digit at the current position. The real digits are the events that cause the transitions from state to state and the OCR results are the observations. The confusion vector represents the probability of such a transition being observed in accordance with the OCR results. The Markov representation is appropriate because at each position, the probability of a transition to a value of the accumulated sum only depends upon the previous value of the accumulated sum and the probability distribution, represented as the confusion vector, of the current observation.

Figure 3:
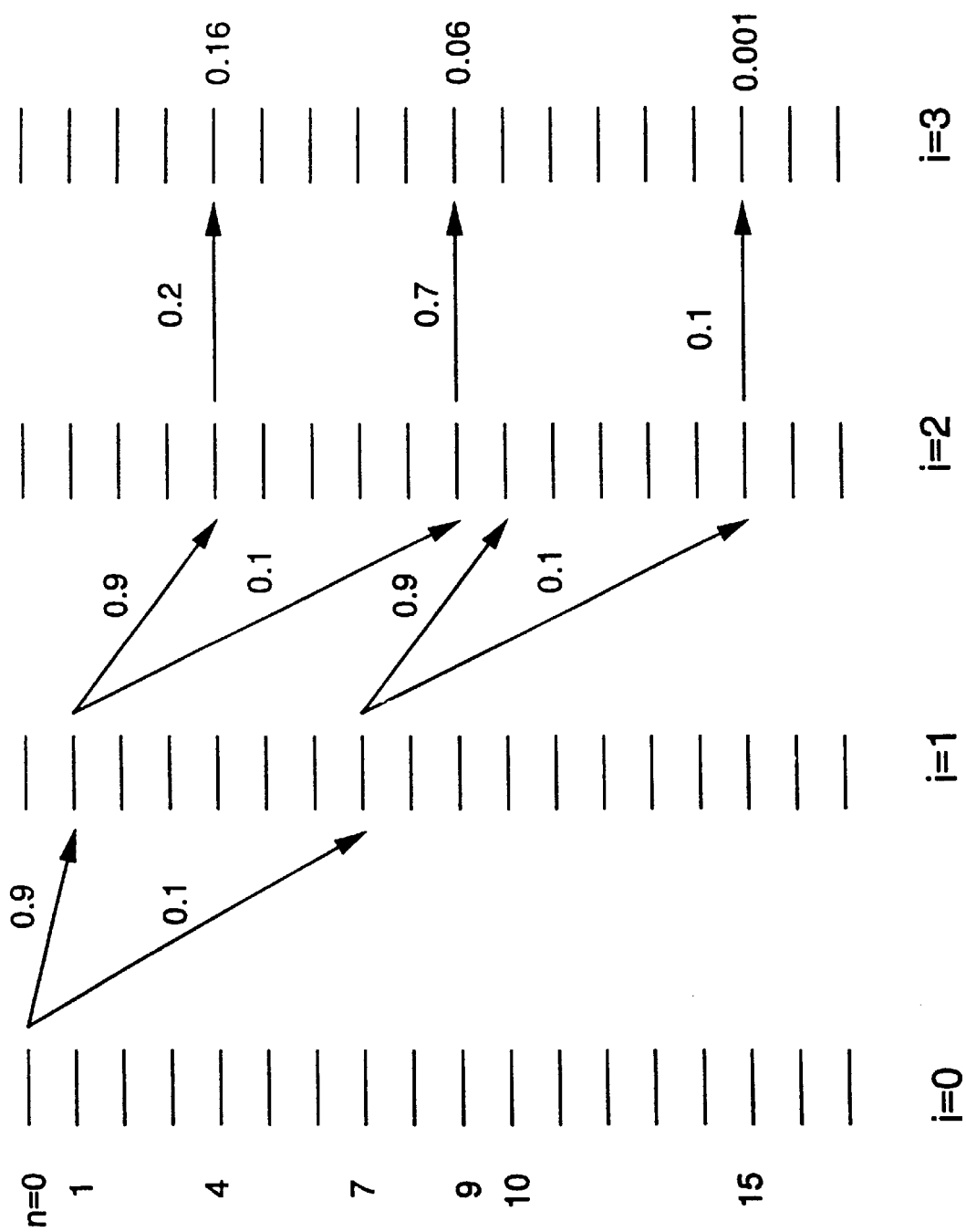
FIG. 3 is a state diagram for a first illustrative example.

This concept is illustrated in FIG. 3 for the above example. The arrows in FIG. 3 represent possible transitions between the states represented by the short horizontal lines. The index i is the row number and n is the accumulated total. An initial state corresponding to no events having occurred, ie i=0, is established. For this state, the accumulated sum n=0. It is assumed that the confusion vector for the first digit in the column is (0,0.9,0,0,0,0,0,0.1,0,0) as above. This means that there is a probability of 0.9 of a transition to n=1 and a probability of 0.1 of a transition to n=7 at the first event i=1. These transition probabilities are indicated in FIG. 3.

If the confusion vector for the second digit in the column is (0,0,0,0.9,0,0,0,0,0.1,0) then after the second event i=2, there are four possible states that the system could be in, namely the states corresponding to values of the accumulated total 4, 9, 10 and 15. The probabilities of each of these states can be calculated from the products of the probabilities of the events required to reach the state.

The confusion vector of the last digit in the column is taken into account via a transition from state n to state n at the third event, j=3, with the probability being multiplied by P (3,1, n modulo 10). As a result there are three possible values of the last digit in the column and their probabilities can be calculated. As can be seen from the example of FIG. 3, the most likely state for the system to be in after three events is n=4. The path used to reach this state can be traced back to find the events that led to this result, ie the topmost set of arrows in FIG. 3 which passes through states n=0, n=1, n=4. From this path the most likely set of events can be unambiguously established, ie in this case the sum 1+3=4, and the OCR result corrected.

It will be realized that, following a series of events, there could be more than one path which arrives at a particular state. In this case, the most likely path is chosen and other paths discarded.

Figure 4A:
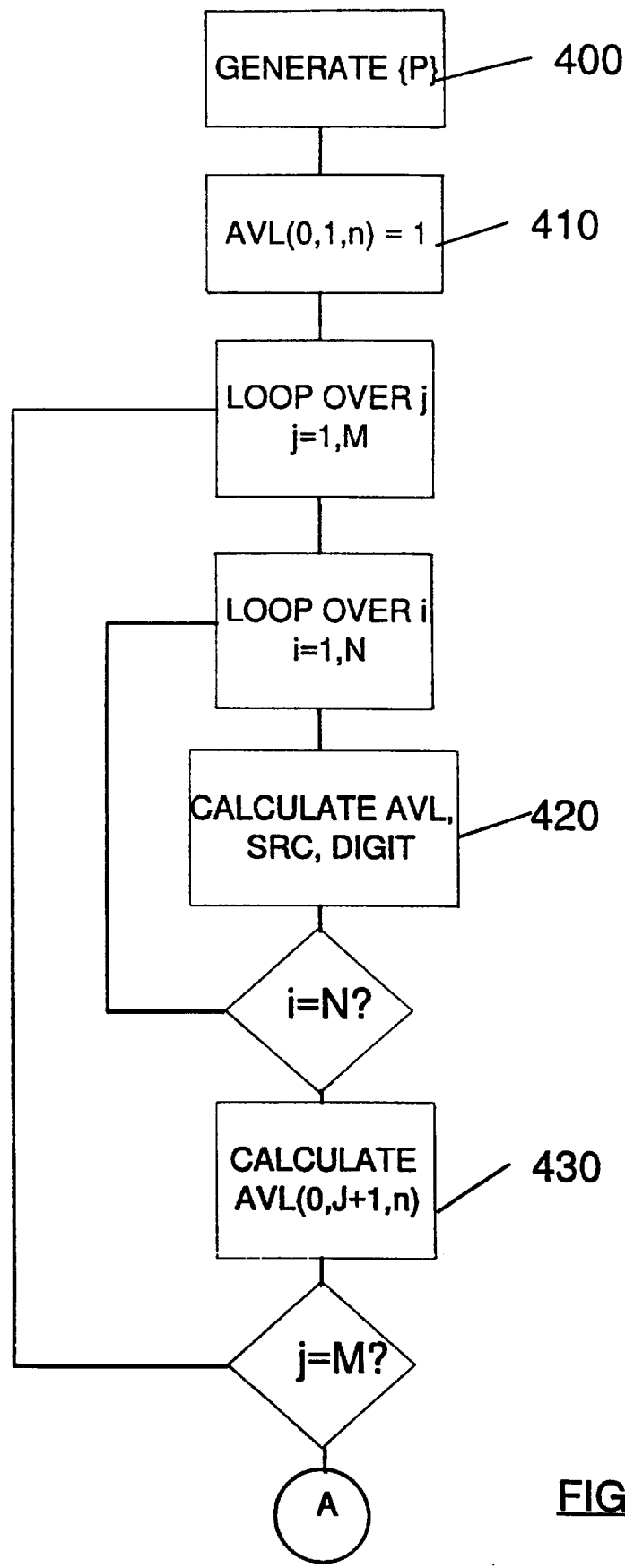
FIGS. 4A and 4B are flow diagrams showing the correction process.
Figure 4B:
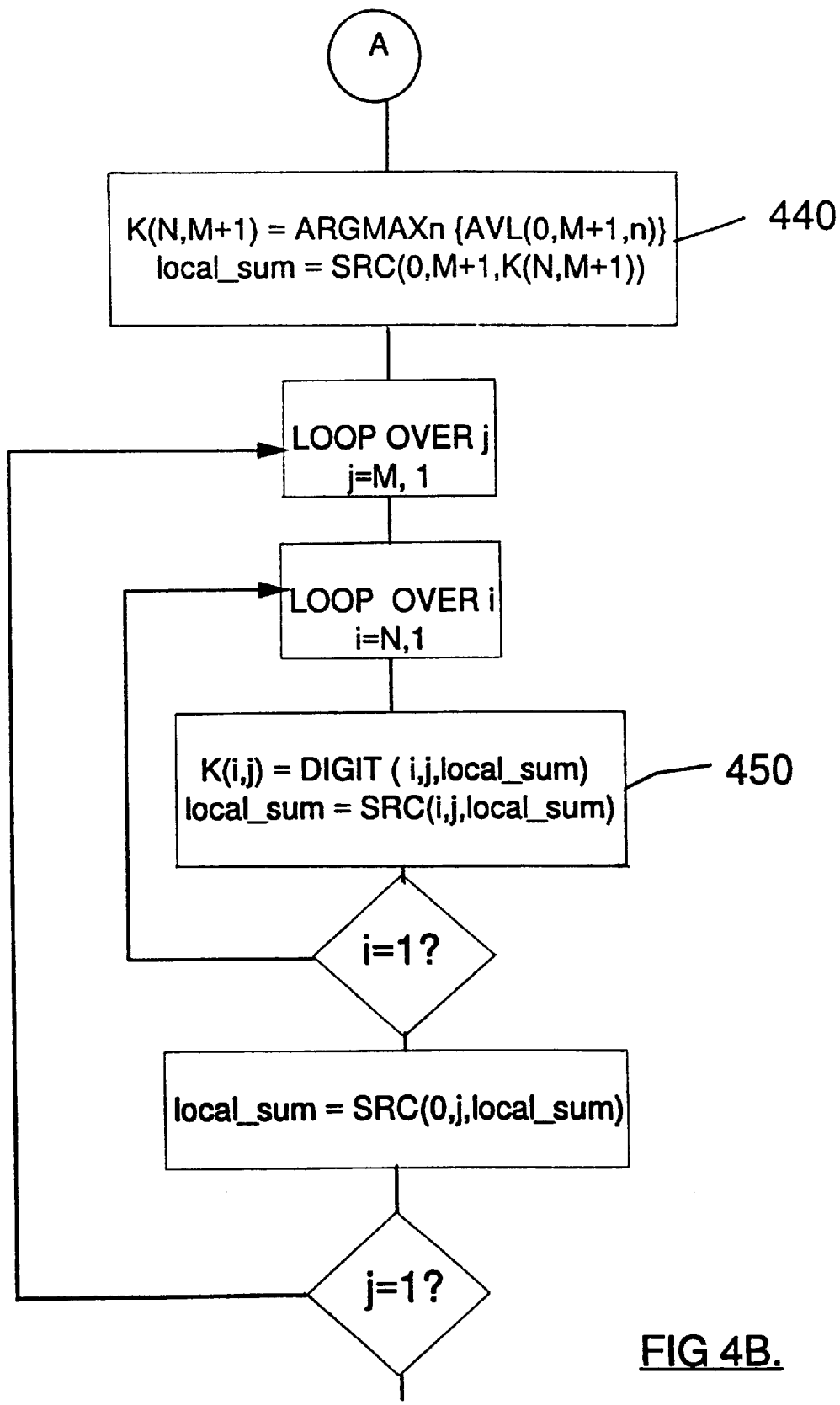

The process followed in the present implementation is illustrated schematically in the flow diagrams of FIGS. 4A and 4B. As discussed, the first step 400 is to prepare the confusion vectors {P}.

Whilst the initial state of the rightmost column in any sum is n=0, the initial state of any other column depends upon a carry value, which in turn depends upon the final state of the column immediately to its right. For this reason the columns are processed from right to left and an initial state for each column is established depending upon the probabilities of the final state in the column to its right. This is described in more detail below.

In order to keep track of the paths and their associated probabilities, for each digit position (i,j) a series of vectors—AVL(i,j,n), SRC(i,j,n) and DIGIT(i,j,n) are prepared. At each digit position in each column, AVL contains the probability of an accumulated value n at that position and is populated as described below. The index n therefore ranges over each possible value of the accumulated sum, ie $n_{max}=9*(N-1)$. In the above example, where N=3, $n_{max}$ would be 18, although for lower values of j smaller values may be used.

SRC and DIGIT are auxiliary values associated with each AVL value which record the interpretation of the input which was used to produce each value in the AVL. The vector SRC contains the previous state required to reach (sometimes referred to as the source) each possible state at each i,j position and the vector DIGIT contains the event required at each position to reach those states.

The AVL vector is calculated by scanning down the columns, starting with the rightmost column, corresponding to j=1, and calculating AVL as follows:

--- p (i,j,d) is the confusion vector of the current location;
n is the currently considered accummulated sum, ie the value whose likelihood is calculated;
d is the current digit, d = 0..9.
For a '+' operation:
AVL (i,j,n) = MAY {AVL(i − 1,j ,n − d) *p (i,j,d)} for d = 0..9;
For a '−' operation:
AVL (i,j,n) = MAX {AVL (i − 1,j,n + d) *p (i,j,d)} for d = 0..9;
For a '=' operation:
AVL (i,j,n) = AVL(i − 1,j,n) *p (i,j,n modulo 10).

---

SRC and DIGIT are calculated as follows:

---

For a '+' operation:
SRC (i,j,n) = ARGMAX$_n$ {AVL(i − 1,j,n − d) *p (i,j,d)}, d = 0..9;
DIGIT (i,j,n) = n − SRC (i,j,n)
For a '−' operation:
SRC (n) = ARGMAX$_n$ {AVL(i − 1,j,n + d), *p (i,j,d)}, d = 0..9;
DIGIT (n) = SRC (i,j,n) − n.
For a '=' operation;
SRC (n) = n;
DIGIT (n) = n modulo 10.

---

Where ARGMAX$_n$ {L(n)} is the value of the index n corresponding to the maximum value of the vector L.

AVL, SRC and DIGIT are calculated for each (i,j) value in step 420. It will be appreciated that other calculations could be used for updating AVL from one row to the next. In particular, the probability of an accumulated sum may be computed based on the probabilities of all the paths leading to that sum.

For the first column the value of AVL(0,1,0)=1.0, and this is set in step 410 in FIG. 4A. For subsequent columns AVL(0,j,n), which represents the likelihood of a carry of n, is calculated from the likelihoods of 0 to 9, 10 to 19, 20 to 29 etc. In the present implementation, for j greater than 1, AVL(0,j,n)=MAX{AVL(N,j−1,m)} for m=10n to m=10*(n+1)−1, SRC(0,j,n)=ARGMAX$_m$ {AVL(N,j−1,m)} for m=10n to m=10*(n+1)−1.

In practice, the values AVL(0,j,n) containing the carry values may be stored in a separate vector. This calculation is shown as step 430 in FIG. 4A.

In the preferred implementation, all probabilities are represented by their logarithms and all probability multiplications implemented using appropriate additions. This is done to prevent underflow. Alternatively, in a direct representation the probability vectors AVL(0,j,n) could be normalized.

Following this process each location in the matrix K has a triplet of sets of values (SRC,DIGIT,AVL) associated with it. The vector SRC contains the previous state required to reach each possible state at each i,j position and the vector DIGIT contains the event required at each position to reach those states.

For the last column, the highest value in AVL(0,M+1,n) is found as shown in step 440 in FIG. 4B. This value uniquely determines the most likely path through the set of states. The corresponding value of n determines the leftmost digit or digits in the last row, ie K(N,M+1). Once the leftmost digit in the last row is determined, it is possible to reconstruct the most likely path to produce this digit using the values stored in SRC and DIGIT.

This is achieved as follows. There are two relevant variables local_sum and digit. Initially local_sum=digit= K(N,M+1).
The next values of these variables are calculated as follows:
current_digit=DIGIT (i,j, current_local_sum)
next_local_sum=SRC (i,j, current_local_sum)

This is shown in step 450 of FIG. 4B.
The next (i,j) location is determined by
a) if i=1 and j=1 then stop,
b) if i=0 then
   j=j−1
   i=N
c) else i=i−1.

This is equivalent to following back the arrows from state n=4 at i=3 in FIG. 3.

This procedure will be further illustrated with the following more complex example involving a subtraction in which a carry from other columns affects the local decisions.

Imagine the calculation:

|   |   |   |
|---|---|---|
|   | 9 | ?6 |
| − | 4 | 8 |
| = | ?4 | 2 | where a question mark before a digit means that the OCR module is not sure about the recognition. In these cases the confusion vector is set to 0.5 for the unsure digit and 0.0056 for the rest. If there is no question mark before a digit the confusion vector is set to 0.99 for the recognized digit and 0.001 for the rest.

The above described process gives the following results for the vectors SRC, AVL and DIGIT.

Col 2 (j = 1)
Row 1 (i = 1) (?6)

(n = 0, AVL = 0.056, SRC = 0, DIGIT = 0) (n = 1, AVL = 0.056, SRC = 0, DIGIT = 1) (n = 2, AVL = 0.056, SRC = 0, DIGIT = 2) (n = 3, AVL = 0.056, SRC = 0, DIGIT = 3) (n = 4, AVL = 0.056, SRC = 0, DIGIT = 4) (n = 5, AVL = 0.056, SRC = 0, DIGIT = 5) (n = 6, AVL = 0.500, SRC = 0, DIGIT = 6) (n = 7, AVL = 0.056, SRC = 0, DIGIT = 7) (n = 8, AVL = 0.056, SRC = 0, DIGIT = 8) (n = 9, AVL = 0.056, SRC = 0, DIGIT = 9)
Row 2 (i = 2) ( 8)

(n = −9, AVL = 0.000, SRC = 0, DIGIT = 9) (n = −8, AVL = 0.055, SRC = 0, DIGIT = 8) (n = −7, AVL = 0.055, SRC = 1, DIGIT = 8) (n = −6, AVL = 0.055, SRC = 2, DIGIT = 8) (n = −5, AVL = 0.055, SRC = 3, DIGIT = 8) (n = −4, AVL = 0.055, SRC = 4, DIGIT = 8) (n = −3, AVL = 0.055, SRC = 5, DIGIT = 8) (n = −2, AVL = 0.498, SRC = 6, DIGIT = 8) (n = −1, AVL = 0.055, SRC = 7, DIGIT = 8) (n = 0, AVL = 0.055, SRC = 8, DIGIT = 8) (n = 1, AVL = 0.055, SRC = 9, DIGIT = 8) (n = 2, AVL = 0.001, SRC = 6, DIGIT = 4) (n = 3, AVL = 0.001, SRC = 6, DIGIT = 3) (n = 4, AVL = 0.001, SRC = 6, DIGIT = 2) (n = 5, AVL = 0.001, SRC = 6, DIGIT = 1) (n = 6, AVL = 0.001, SRC = 6, DIGIT = 0) (n = 7, AVL = 0.000, SRC = 9, DIGIT = 2) (n = 8, AVL = 0.000, SRC = 9, DIGIT = 1) (n = 9, AVL = 0.000, SRC = 9, DIGIT = 0)
Row 3 (i = 3) ( 2)

(n = −9, AVL = 0.000, SRC = −9, DIGIT = 1) (n = −8, AVL = 0.972, SRC = −8, DIGIT = 2) (n = −7, AVL = 0.001, SRC = −7, DIGIT = 3) (n = −6, AVL = 0.001, SRC = −6, DIGIT = 4) (n = −5, AVL = 0.001, SRC = −5, DIGIT = 5) (n = −4, AVL = 0.001, SRC = −4, DIGIT = 6) (n = −3, AVL = 0.001, SRC = −3, DIGIT = 7) (n = −2, AVL = 0.010, SRC = −2, DIGIT = 8) (n = −1, AVL = 0.001, SRC = −1, DIGIT = 9) (n = 0, AVL = 0.001, SRC = 0, DIGIT = 0) (n = 1, AVL = 0.001, SRC = 1, DIGIT = 1) (n = 2, AVL = 0.010, SRC = 2, DIGIT = 2) (n = 3, AVL = 0.000, SRC = 3, DIGIT = 3) (n = 4, AVL = 0.000, SRC = 4, DIGIT = 4) (n = 5, AVL = 0.000, SRC = 5, DIGIT = 5) (n = 6, AVL = 0.000, SRC = 6, DIGIT = 6) (n = 7, AVL = 0.000, SRC = 7, DIGIT = 7) (n = 8, AVL = 0.000, SRC = 8, DIGIT = 8) (n = 9, AVL = 0.000, SRC = 9, DIGIT = 9)
Carry:

(n = −1, AVL = 0.988, SRC = −8, DIGIT = IRRELEVANT) (n = 0, AVL = 0.012, SRC = 2, DIGIT = IRRELEVANT)
Col 1 (j = 2)
Row 1 (i = 1) ( 9)

(n = −1, AVL = 0.001, SRC = −1, DIGIT = 0) (n = 0, AVL = 0.001, SRC = −1, DIGIT = 1) (n = 1, AVL = 0.001, SRC = −1, DIGIT = 2) (n = 2, AVL = 0.001, SRC = −1, DIGIT = 3) (n = 3, AVL = 0.001, SRC = −1, DIGIT = 4) (n = 4, AVL = 0.001, SRC = −1, DIGIT = 5) (n = 5, AVL = 0.001, SRC = −1, DIGIT = 6) (n = 6, AVL = 0.001, SRC = −1, DIGIT = 7) (n = 7, AVL = 0.001, SRC = −1, DIGIT = 8) (n = 8, AVL = 0.978, SRC = −1, DIGIT = 9) (n = 9, AVL = 0.012, SRC = 0, DIGIT = 9)
Row 2 (i = 2) ( 4)

(n = −10, AVL = 0.000, SRC = −1, DIGIT = 9) (n = −9, AVL = 0.000, SRC = 0, DIGIT = 9) (n = −8, AVL = 0.000, SRC = 1, DIGIT = 9) (n = −7, AVL = 0.000, SRC = 2, DIGIT = 9) (n = −6, AVL = 0.000, SRC = 3, DIGIT = 9) (n = −5, AVL = 0.001, SRC = −1, DIGIT = 4) (n = −4, AVL = 0.001, SRC = 0, DIGIT = 4) (n = −3, AVL = 0.001, SRC = 1, DIGIT = 4) (n = −2, AVL = 0.001, SRC = 2, DIGIT = 4) (n = −1, AVL = 0.001, SRC = 3, DIGIT = 4) (n = 0, AVL = 0.001, SRC = 4, DIGIT = 4) (n = 1, AVL = 0.001, SRC = 5, DIGIT = 4) (n = 2, AVL = 0.001, SRC = 6, DIGIT = 4) (n = 3, AVL = 0.001, SRC = 7, DIGIT = 4) (n = 4, AVL = 0.975, SRC = 8, DIGIT = 4) (n = 5, AVL = 0.012, SRC = 9, DIGIT = 4) (n = 6, AVL = 0.001, SRC = 8, DIGIT = 2) (n = 7, AVL = 0.001, SRC = 8, DIGIT = 1) (n = 8, AVL = 0.001, SRC = 8, DIGIT = 0) (n = 9, AVL = 0.000, SRC = 9, DIGIT = 0)
Row 3 (i = 3) (?4)

(n = −10, AVL = 0.000, SRC = −10, DIGIT = 0) (n = −9, AVL = 0.000, SRC = −9, DIGIT = 1) (n = −8, AVL = 0.000, SRC = −8, DIGIT = 2) (n = −7, AVL = 0.000, SRC = −7, DIGIT = 3) (n = −6, AVL = 0.000, SRC = −6, DIGIT = 4) (n = −5, AVL = 0.000, SRC = −5, DIGIT = 5) (n = −4, AVL = 0.000, SRC = −4, DIGIT = 6) (n = −3, AVL = 0.000, SRC = −3, DIGIT = 7) (n = −2, AVL = 0.000, SRC = −2, DIGIT = 8) (n = −1, AVL = 0.000, SRC = −1, DIGIT = 9) (n = 0, AVL = 0.000, SRC = 0, DIGIT = 0) (n = 1, AVL = 0.000, SRC = 1, DIGIT = 1) (n = 2, AVL = 0.000, SRC = 2, DIGIT = 2) (n = 3, AVL = 0.000, SRC = 3, DIGIT = 3) (n = 4, AVL = 0.997, SRC = 4, DIGIT = 4) (n = 5, AVL = 0.001, SRC = 5, DIGIT = 5) (n = 6, AVL = 0.000, SRC = 6, DIGIT = 6) (n = 7, AVL = 0.000, SRC = 7, DIGIT = 7) (n = 8, AVL = 0.000, SRC = 8, DIGIT = 8) (n = 9, AVL = 0.000, SRC = 9, DIGIT = 9)
Carry:

(n = −1, AVL = 0.001, SRC = −5, DIGIT = IRRELEVANT) (n = 0, AVL = 0.999, SRC = 4. DIGIT = IRRELEVANT)

Figure 5A:
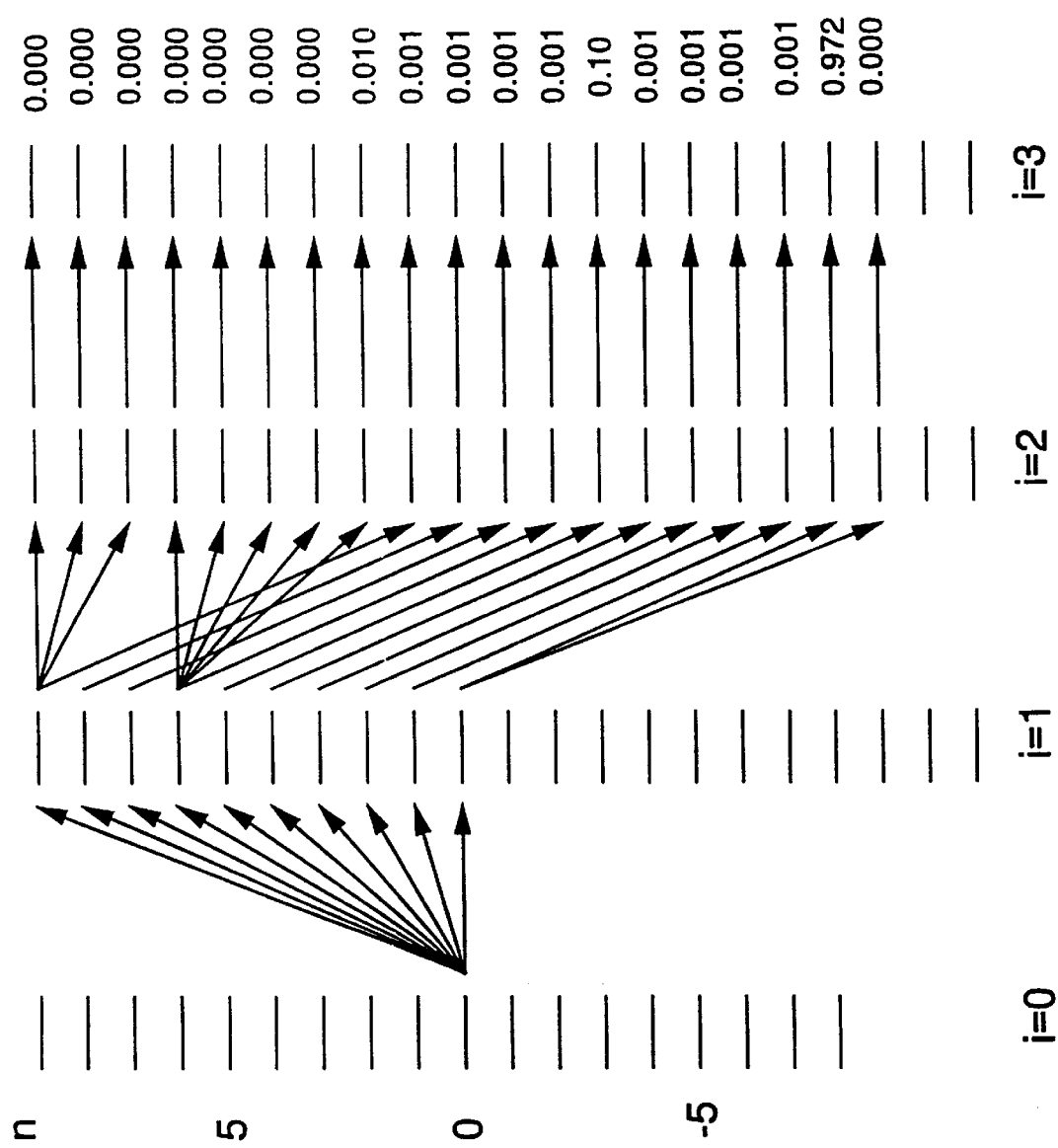
FIGS. 5A and 5B are state diagrams for a second illustrative example.
Figure 5B:
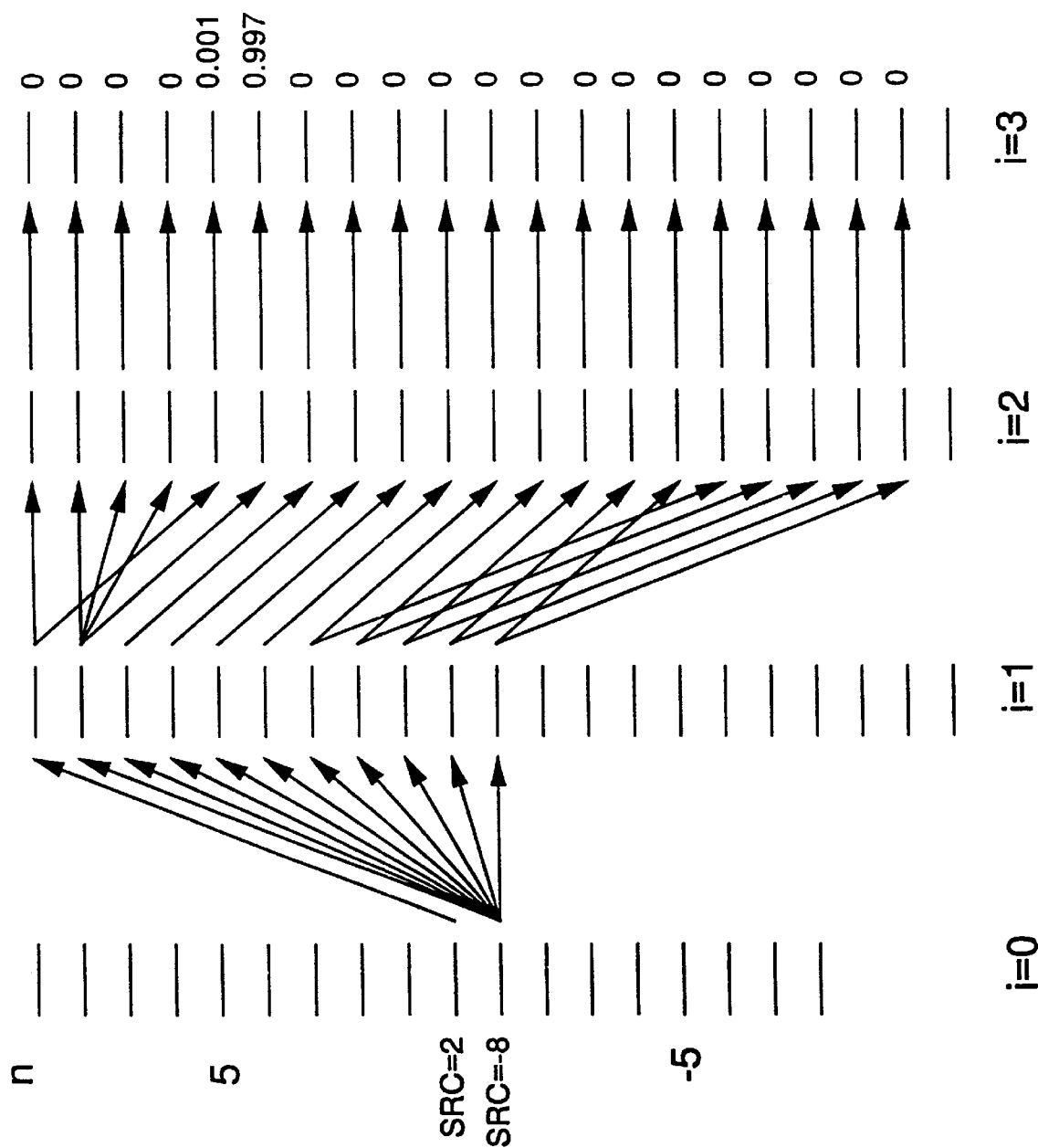

The corresponding transition paths are shown in FIGS. 5A and 5B.

The most likely final state is therefore n=0 with probability 0.999. This corresponds to a 0 at (i,j)=(3,3). The corresponding SRC value is 4, which corresponds to DIGIT=4 at (i,j)=(3,2). The SRC value for this position is SRC=4 corresponding to DIGIT=4 at (i,j)=(2,2). Similarly the rest of the path can be reconstructed as follows:

| i | j | DIGIT | SRC |
|---|---|---|---|
| 0 | 3 | 0 | 4 |
| 3 | 2 | 4 | 4 |
| 2 | 2 | 4 | 8 |
| 1 | 2 | 9 | −1 |
| 0 | 2 | IRRELEVANT | −8 |
| 3 | 1 | 2 | −8 |
| 2 | 1 | 8 | 0 |
| 1 | 1 | 0 | 0 |

Giving the corrected sum as 90−48=42.

It will be appreciated that the above description merely illustrates one possible embodiment of the invention and that many other possibilities exist. For example, there are many other types of state machines which have been used in Hidden Markov Models and which could be used in this application. Similarly, other techniques which have been developed for use with Markov models, including learning algorithms could be employed to improve performance.

As will be clear from the above description, the present implementation takes the form of one or more computer programs for use with a general purpose computer. The programs can be distributed in the form of an article of manufacture comprising a computer usable medium in which suitable program code is embodied for causing a computer to perform the various functions described above.

INDUSTRIAL APPLICABILITY

The invention is applicable in the technical fields of data processing and optical character recognition (OCR).

We claim:

1. Computer-based apparatus for correcting a numeric data signal input and stored as a set of digital representations of numbers in computer-readable memory, the digital representations each having associated therewith an estimable error probability distribution and there being at least one known arithmetic relation between the numbers which is expressed as one of a sum, a difference and an equality, comprising:

optimization means using a Hidden Markov Model for finding a most likely path through a set of states in accordance with probability functions recording the likelihood of transitions between the states giving rise to a set of event related observations, wherein:

the states are possible accumulated totals generated by adding or subtracting a respective one of the numbers to or from an initial accumulated total, addition or subtraction of the numbers to or from an accumulated total or equality of an accumulated total with the numbers are the events causing transitions from state to state, the digital representations are the event related observations, and the error probability distributions are the probability functions; and means for correcting the digital representations in accordance with events giving rise to the most likely path through the states, said corrected digital representations being storable in said computer-readable memory.

2. Apparatus as claimed in claim 1 wherein the numbers are single digits.

3. Apparatus as claimed in claim 1 further comprising means for generating a carry forward value from a sequence of numbers to form an initial accumulated total for a second sequence of numbers.

4. Apparatus as claimed in claim 1 wherein the optimization means comprises:

means to record a vector representing a set of likelihoods for each of a set of possible current states;

means to calculate, from one of the digital representations, the likelihood of possible transitions from each of the set of current states to each of a set of possible next states;

means to combine the likelihood of a current state with the likelihood of a transition to each of the set of next states, to generate a likelihood for each of the next states;

means to record, for each of the next states, the most likely transition leading to that state.

5. Apparatus as claimed in claim 4 wherein the optimization means further comprises means to determine the most likely final state; means to reconstruct the sequence of transitions leading to the most likely final state, the apparatus comprising means to correct the digital representations in accordance with the events giving rise to the sequence of transitions leading to the most likely final state.

6. Optical character recognition apparatus comprising apparatus as claimed in claim 1 wherein the digital representations are a set of observed recognition results.

7. A computer implemented method for correcting a numeric data signal input and stored as a set of digital representations of numbers in computer-readable memory, the digital representations each having an estimable error probability distribution and the numbers having at least one known arithmetic relation between them which is expressed as one of a sum, a difference and an equality, comprising the steps of:

finding a most likely path through a set of states of a Hidden Markov Model in accordance with a probability function recording the likelihood of transitions between the states giving rise to a set of event related observations, such that the states are possible accumulated totals generated by adding or subtracting ones of the numbers to or from an initial accumulated total, addition or subtraction of the numbers to or from an accumulated total or equality of an accumulated total with the numbers are the events causing transitions from state to state, the digital representations are the event related observations, and the error probability distributions are the probability functions; and correcting the digital representations in accordance with events giving rise to the most likely path through the states, said corrected digital representations being storable in said computer-readable memory.

8. A method as claimed in claim 7 comprising:

recording a vector representing a set of likelihoods for each of a set of possible current states;

calculating, from one of the set of digital representations, the likelihood of possible transitions from each of the set of current states to each of a set of possible next states;

combining the likelihood of a current state with the likelihood of a transition to each of the set of next states, to generate a likelihood for each of the next states;

recording, for each of the next states, the most likely transition leading to that state;

determining a most likely final state;

reconstructing the sequence of transitions leading to the most likely final state.

9. A method for optical character recognition including the step of correcting a set of recognition results using a method as claimed in claim 7.

10. An article of manufacture comprising a computer usable medium in which program code is embodied for causing a computer to perform a method as claimed in claim 7.

* * * * *